(12) United States Patent  
Doan et al.

(10) Patent No.: US 8,413,696 B2  
(45) Date of Patent: Apr. 9, 2013

(54) PNEUMATIC TIRE

(75) Inventors: Van Quang Doan, Osaka (JP); Koji Matsuyama, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 12/864,535

(22) PCT Filed: Oct. 3, 2008

(86) PCT No.: PCT/JP2008/068021  
§ 371 (c)(1),  
(2), (4) Date: Jul. 26, 2010

(87) PCT Pub. No.: WO2009/096064  
PCT Pub. Date: Aug. 6, 2009

(65) Prior Publication Data  
US 2010/0307652 A1 Dec. 9, 2010

(30) Foreign Application Priority Data  
Feb. 1, 2008 (JP) .................. 2008-023137

(51) Int. Cl.  
*B60C 11/13* (2006.01)
(52) U.S. Cl. .................. 152/209.18
(58) Field of Classification Search .......... 152/154.2, 152/209.1, 209.3, 209.8, 209.9, 209.16, 209.17, 152/209.18, 209.25, 523  
See application file for complete search history.

(56) References Cited

U.S. PATENT DOCUMENTS

| 6,484,772 | B1 | 11/2002 | De Labareyre et al. |
| 8,047,244 | B2 * | 11/2011 | Yoshikawa et al. ...... 152/209.18 |
| 2006/0042738 | A1 | 3/2006 | Matsumoto |
| 2008/0047641 | A1 | 2/2008 | Takahashi |

FOREIGN PATENT DOCUMENTS

| JP | 10-315711 | 12/1998 |
| JP | 2001-511733 | 8/2001 |
| JP | 2001-277815 | 10/2001 |
| JP | 2006-69305 | 3/2006 |
| JP | 2008-49791 | 3/2008 |
| JP | 2008-290541 | 12/2008 |

* cited by examiner

*Primary Examiner* — Eric Hug  
(74) *Attorney, Agent, or Firm* — Fish & Richardson P.C.

(57) ABSTRACT

A pneumatic tire comprises main grooves 1 extending in the tire circumferential direction formed in a tread, wherein the main groove 1 has a plurality of narrow grooves 11 in its sidewalls 3, an end portion 11a of the narrow groove 11 on the tread side does not open to the tread surface and is located closest to the tread side, an end portion 11b of the narrow groove 11 on the groove bottom side does not open to the groove bottom 1b of the main groove 1 and is located closest to the groove bottom side, a length L1 of the narrow groove 11 measured in the depth direction of the main groove is 50 to 80% of a depth D of the main groove 1, the narrow groove 11 has at least one or more bend portions 21, and a length L2 of the narrow groove 11 measured along the narrow groove 11 itself is not less than 1.03 times and not more than 2 times L1.

1 Claim, 3 Drawing Sheets

(a)

(b)

(c)

(d)

(e)

(f)

(a)

(b)

PNEUMATIC TIRE

TECHNICAL FIELD

The present invention relates to a pneumatic tire in which air pipe resonance noise is reduced without degrading drainage performance.

This application claims benefit of priority based on Japanese Patent Application No. 2008-023137 filed on Feb. 1, 2008, the entire same contents of which are herein incorporated by reference.

BACKGROUND ART

In a state where a tire contacts the ground, pipe space is formed by a main groove extending in the tire circumferential direction and road surface. The rotation of tires lets air compressed in the pipe space to release outside, and as a result, air pipe resonance noise is generated. Since the air pipe resonance noise is offensive noise whose frequency is around 1 kHz, reduction in air pipe resonance noise has been demanded conventionally. For example, the pneumatic tire disclosed in Patent document 1 has a great number of oblong holes extending in the depth direction of a main groove formed in a sidewall of the main groove. Due to the oblong holes, friction resistance against the air flow in the main groove is increased, resulting in reduction of air pipe resonance noise.

Patent Document 1: Unexamined Japanese Laid-Open Patent Publication No. 10-315711(FIG. 1)

DISCLOSURE OF THE INVENTION

Problem to be Solved by the Invention

Although air pipe resonance noise is reduced even with the above-mentioned tire, reduction in noise from tires has been more demanding in recent years. Therefore, it has been required to further reduce air pipe resonance noise. Air pipe resonance noise can be reduced by changing the arrangement, width, shape of the main groove. However, there is concern that other performances of the tire, such as drainage performance, maybe degraded. Thus, it is necessary that air pipe resonance noise be further reduced by devising the shape of the oblong holes.

Therefore, the object of the present invention is to provide a pneumatic tire in which air pipe resonance noise is reduced without degrading drainage performance.

Means for Solving the Problems

The pneumatic tire of the present invention has main grooves extending in the tire circumferential direction formed in a tread. The pneumatic tire having main grooves extending in the tire circumferential direction formed in a tread is characterized in that the main groove has a plurality of narrow grooves in its sidewalls, a length L1 of the narrow groove measured in the depth direction of the main groove is 50 to 80% of a depth D of the main groove, the narrow groove has at least one or more bent portions, an end portion of the narrow groove on the tread side does not open to the tread surface and is located closest to the tread side, an end portion of the narrow groove on the groove bottom side does not open to the groove bottom of the main groove and is located closest to the groove bottom side, and a length L2 of the narrow groove measured along the narrow groove itself is not less than 1.03 times and not more than 2 times L1.

Due to the narrow grooves formed in the sidewalls of the main groove, friction resistance against the air flow in the main groove is increased. Furthermore, due to the bent portions, swirl of the air flow is generated in the vicinity of the bent portions and friction resistance against the air flow in the main groove is increased more, whereby air pipe resonance noise is more greatly reduced.

DESCRIPTION OF THE REFERENCE NUMERALS

| | |
|---|---|
| 1 | main groove |
| 2 | block |
| 3 | sidewall of main groove |
| 11 | narrow groove |
| 21 | bent portion |

Figure 1:
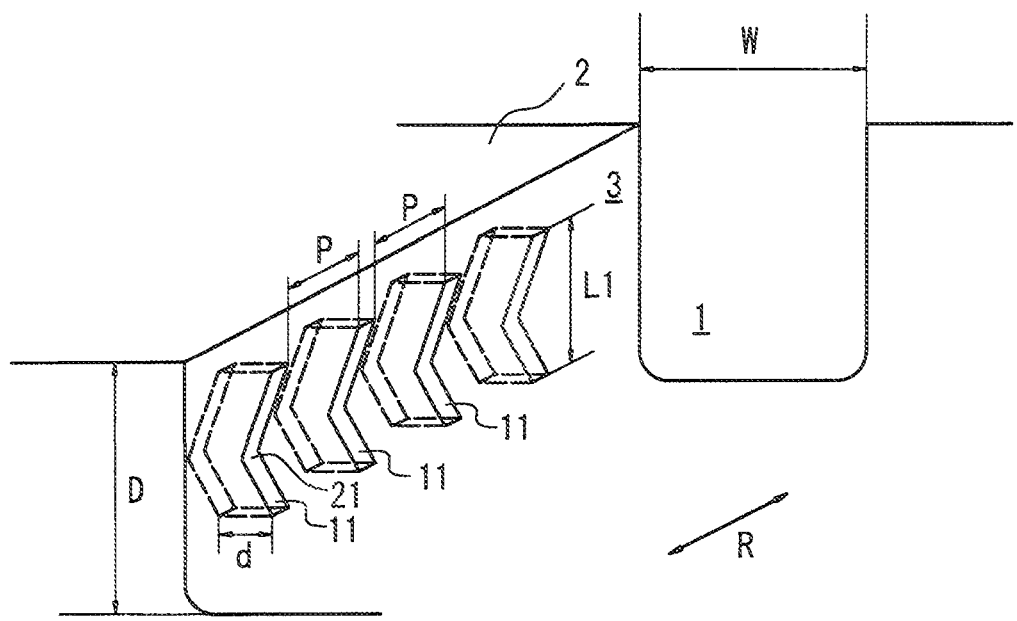
FIG. 1 is a view showing a sidewall of a main groove of the pneumatic tire related to the present invention.
Figure 2:
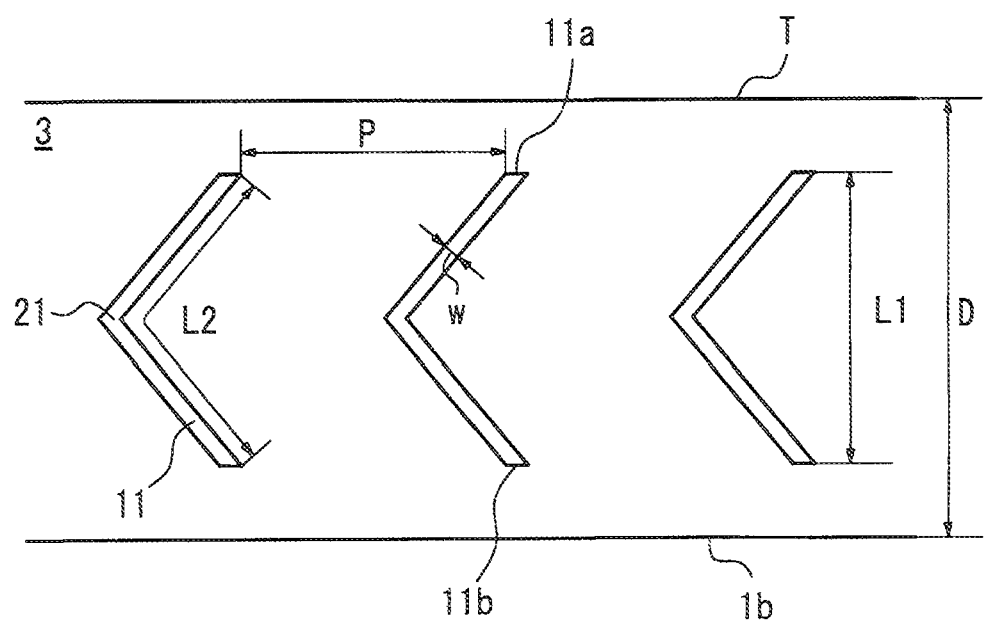
FIG. 2 is a view showing part of a sidewall 3 of a main groove 1.

Hereinafter, embodiments for carrying out the pneumatic tire of the present invention are described with referent to drawings. FIG. 1 is a view showing a sidewall of a main groove of the pneumatic tire related to the present invention. FIG. 2 shows part of a sidewall 3 of a main groove 1. The main grooves 1 extend in the tire circumferential direction R and form blocks 2 with transverse grooves (not illustrated). The main groove 1 has narrow grooves 11 in the sidewall 3, wherein the narrow grooves 11 having at least one bent portion 21 are bended. In addition, an end portion 11a of the narrow groove 11 on the tread side does not open to the surface of the tread T and is located closest to the tread side. An end portion 11b of the narrow groove 11 on the groove bottom side does not open to the groove bottom 1b of the main groove 1 and is located closest to the groove bottom side. In the opposite sidewall (not illustrated) of the main groove 1, there are also provided the narrow grooves 11 as well. It is noted that although an example of the tire having blocks formed in the tread is given, the same effect can be obtained even if the main grooves that form ribs have the narrow grooves 11 in both sidewalls.

Figure 4:
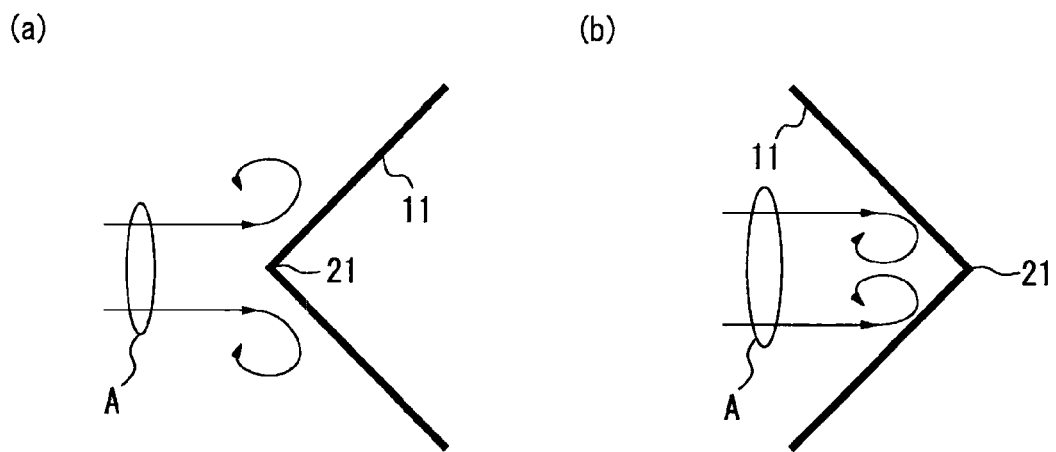
FIGS. 4(a) and (b) are schematic diagrams showing how the air flow is disturbed by a bent portion.

Friction resistance against the air flow in the main groove 1 is increased due to the narrow grooves 11 and as a result, air pipe resonance noise can be reduced. Furthermore, due to the bent portions 21, swirl of the air flow is generated in the vicinity of the bent portions 21 and friction resistance against the air flow in the main groove is then increased more, thereby more greatly reducing air pipe resonance noise. Here, when the narrow groove 11 linearly extends, the bent portion 21 denotes a part where an extending direction of the narrow groove 11 changes discontinuously. When the narrow groove 11 curvedly extends, the bent portion 21 denotes a convex portion in the groove traveling direction, where the tangential line direction is in a depth direction of the main groove 1. It can be presumed that even when air A flows in any direction to the bent portion 21 as shown in FIGS. 4(a) and (b), swirl of flow from the air A is generated as illustrated in the figures.

Therefore, various shapes can be employed as the shape of the narrow groove 11. For example, the narrow groove 11 may have shapes extending in the form of a polygonal line and having one or a plurality of the bent portions 21 as shown in FIGS. 3(a) to (c). In addition, the narrow groove 11 may have a semicircular shape, a shape having two semicircles connected with each other which is provided with two bent portions 21 and a sine wave shape provided with two bent portions 21 as shown in FIGS. 3(d) to (f), respectively. Additionally, from the viewpoint of effectively providing friction resistance against the air flow, it is preferable that the bent portion 21 has a bending angle θ of 60 to 150 degrees in cases of FIGS. 3(a) to (c).

It is preferable that the length L1 of the narrow groove 11 in the depth direction of the main groove is 50 to 80% of the depth D of the main groove 1. When L1 is less than 50% of the depth D of the main groove 1, the friction resistance against the air flow in the main groove 1 is decreased and effect of reducing air pipe resonance noise becomes small. On the other hand, when L1 exceeds 80% of the depth D of the main groove 1, rigidity of the block 2 is decreased and as a result, the tire performance is degraded. Also, a distance between the end portion of the narrow groove 11 and the groove bottom or tread surface of the main groove 1 is shortened, thereby tending to generate cracks. Furthermore, it is preferable that the length L2 of the narrow groove 11 measured along the narrow groove 11 itself is not less than 1.03 times L1, but not more than 2 times L1. When the length L2 is less than 1.03 times L1, the friction resistance against the air flow in the main groove 1 is decreased, whereby air pipe resonance noise is not so much reduced. When the length L2 exceeds 2 times L1, the rigidity of the block 2 is decreased, thereby deteriorating the tire performance.

It is preferable that a width w of the narrow groove 11 is at least not less than 0.5 mm and not more than 0.25 times a width W of the main groove 1. It is preferable that a depth d of the narrow groove 11 is at least not less than 0.2 mm and not more than 0.5 times the width W of the main groove 1. It is preferable that a space p between the narrow grooves 11 is at least not less than 0.4 mm and not more than 0.5 times the width W of the main groove 11. When the width w is too narrow, the depth d is too shallow, or the space p is too broad, out of these ranges, the friction resistance against the air flow in the main groove 1 is decreased, whereby air pipe resonance noise may be not so much reduced.

On the other hand, when the width w is too broad or the depth d is too deep, the rigidity of the block 2 becomes low, thereby deteriorating the tire performance. When the space p is too narrow, an area sandwiched by the adjacent narrow grooves 11 is easily damaged, such as tearing or the like. The production cost of a mold is also increased.

EXAMPLE

Figure 5:
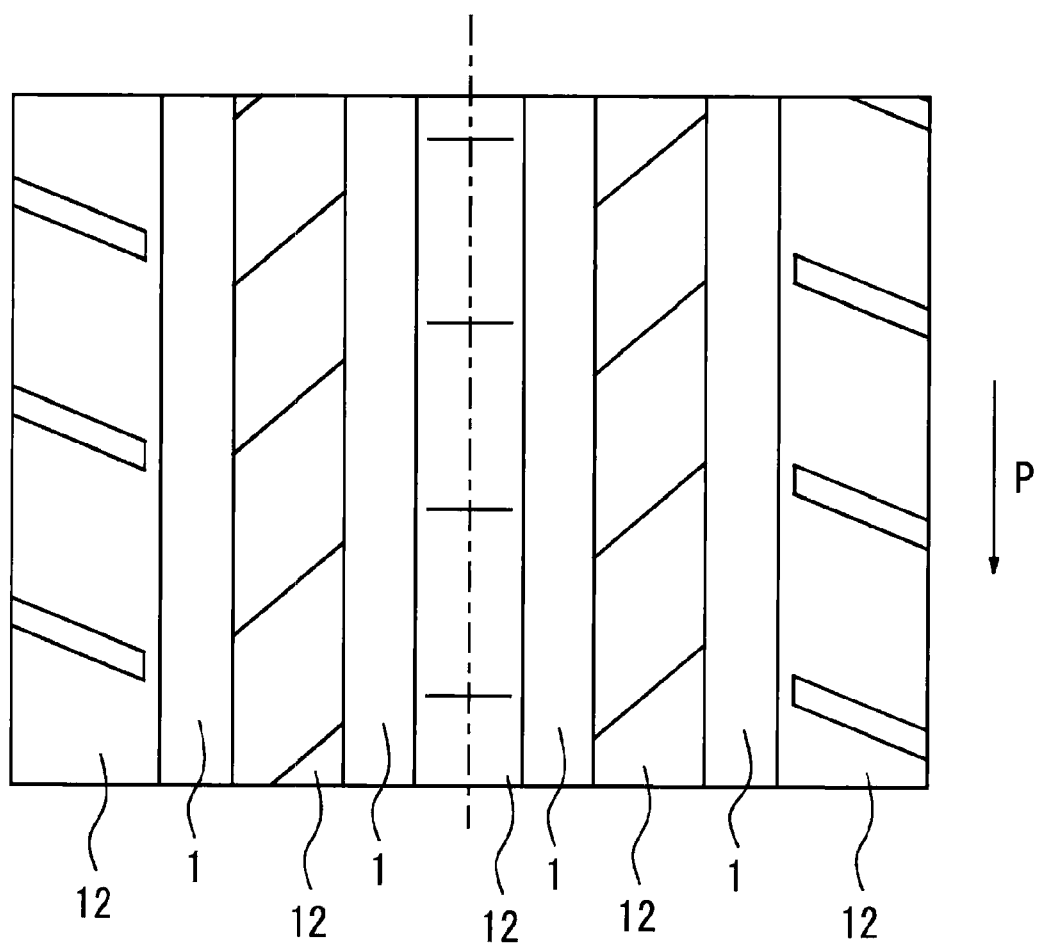
FIG. 5 is a view showing a tread pattern according to Examples and Comparative Examples.

Tires of Examples and Comparative Examples according to the present invention were manufactured and evaluated, respectively. The tires have a tread pattern as shown in FIG. 5, wherein ribs 12 are formed by the main grooves 1 and all the main grooves 1 have narrow grooves formed in both sidewalls. Additionally, the tires have a tire size of 215/60R16 and the rims having a rim size of 16×7-JJ under air pressure of 230 kPa. It is noted that in Examples 1 and 3, the main groove 1 in FIG. 5 has the narrow grooves 11 having the bend portions 21 on the side in the traveling direction P formed in the left-side sidewall of and the narrow grooves 11 having the bend portions 21 on the opposite side to the traveling direction P formed in the right-side sidewall, respectively.

Figure 3:
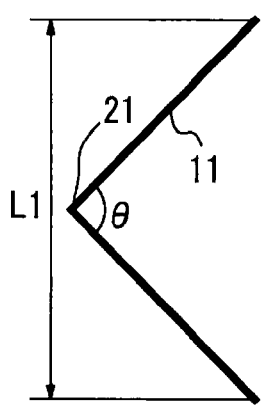
FIGS. 3(a) to (f) are views showing shapes of narrow grooves.
Figure 3:
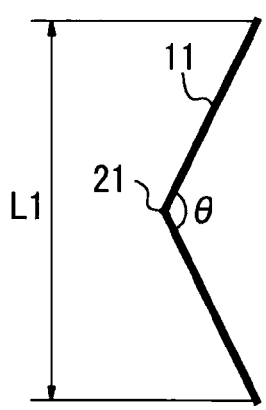
Figure 3:
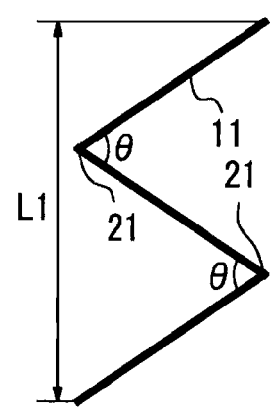
Figure 3:
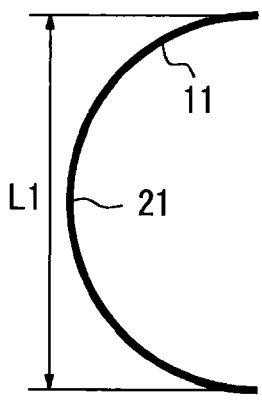
Figure 3:
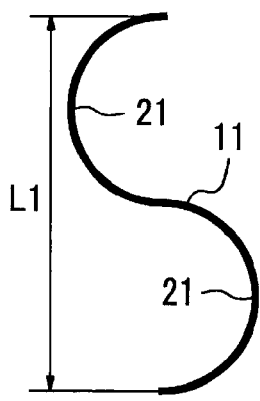
Figure 3:
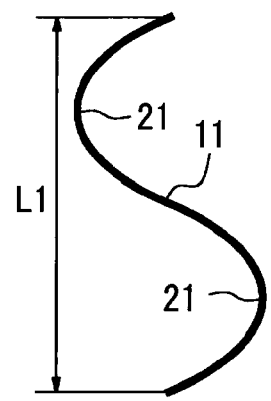

The tires of Examples 1 to 6 were provided with narrow grooves as shown in FIG. 3. The tire of Comparative Example 1 was provided with narrow grooves having no bend portion and the tire of Comparative Example 2 was provided with narrow grooves having bend portions in which L2 was shorter length as compared to Example 1. Each size of the narrow grooves was as shown in Table 1.

Evaluation results are as shown in Table 1. The drainage performance is the speed when hydroplaning started to occur while gradually accelerating a rear-wheel-drive sedan of 2500 cc displacement mounted with the tires on the wet road having a water depth of 8 mm. Indicating by index numbers on the basis that Comparative Example 1 is set as 100, it shows that the larger the number is, the better the drainage performance is.

The noise level is obtained by measurement on air pipe resonance noise level at ⅓ octave-band 1 kHz by a bench test according to JASO-C606 (at a speed of 50 km/h) and represented by decibel value based on Comparative Example 1. If it is the negative value, air pipe resonance noise is reduced.

TABLE 1

| | | Example 1 | Example 2 | Example 3 | Example 4 | Example 5 | Example 6 | Comparative Example 1 | Comparative Example 2 |
|---|---|---|---|---|---|---|---|---|---|
| Size of fine groove | Width w (mm) | 2.0 | 2.0 | 2.0 | 2.0 | 2.0 | 2.0 | 2.0 | 2.0 |
| | Depth d (mm) | 2.0 | 2.0 | 2.0 | 2.0 | 2.0 | 2.0 | 2.0 | 2.0 |
| | Space p (mm) | 1.0 | 1.0 | 1.0 | 1.0 | 1.0 | 1.0 | 1.0 | 1.0 |
| | Length L2/L1 | 1.38 | 1.80 | 1.06 | 1.57 | 1.57 | 1.22 | 1.00 | 1.02 |
| | Shape | FIG. 3(a) | FIG. 3(c) | FIG. 3(b) | FIG. 3(d) | FIG. 3(e) | FIG. 3(f) | — | FIG. 3(a) |
| | Bending angle θ (degree) | 90 | 67 | 143 | — | — | — | — | 158 |
| Length L1 of side in the groove depth direction of virtual region (mm) | | 8.0 | 8.0 | 8.0 | 8.0 | 8.0 | 8.0 | 8.0 | 8.0 |
| Drainage performance | | 100 | 100 | 100 | 100 | 100 | 100 | 100 | 100 |
| Noise level (dB) | | −0.5 | −0.8 | −0.3 | −0.4 | −0.6 | −0.6 | 0 | 0 |

Depth D of main groove: 10.0 mm
Width W of main groove: 8.0 mm

According to Table 1, air pipe resonance noise level is reduced without impairing the drainage performance in any tires of Examples.

What is claimed is:
1. A pneumatic tire having main grooves extending in the tire circumferential direction formed in a tread, wherein a main groove has a plurality of narrow grooves in its sidewalls, a length L1 of a narrow groove measured in the depth direction of the main groove is 50 to 80% of a depth D of the main groove, the narrow groove has at least one or more bend portions, an end portion of the narrow groove on the tread side does not open to the tread surface and is located closest to the tread side, an end portion of the narrow groove on the groove bottom side does not open to the groove bottom of the main groove and is located closest to the groove bottom side, and a length L2 of the narrow groove measured along the narrow groove itself is not less than 1.03 times and not more than 2 times L1, and further wherein a width w of the narrow groove is at least not less than 0.5 mm and not more than 0.25 times a width W of the main groove, a depth d of the narrow groove is at least not less than 0.2 mm and not more than 0.5 times the width W of the main groove, and a space p of the narrow groove is at least not less than 0.4 mm and not more than 0.5 times the width W of the main groove.

\* \* \* \* \*